(12) United States Patent
DelGobbo et al.

(10) Patent No.: US 7,007,229 B2
(45) Date of Patent: Feb. 28, 2006

(54) COMPUTER-IMPLEMENTED SYSTEM AND METHOD FOR WEB-BASED DATA ACCESS

(75) Inventors: Vincent C. DelGobbo, Durham, NC (US); John P. Leveille, Apexl, NC (US)

(73) Assignee: SAS Institute Inc., Cary, NC (US)

( * ) Notice: Subject to any disclaimer, the term of this patent is extended or adjusted under 35 U.S.C. 154(b) by 466 days.

(21) Appl. No.: 10/412,627

(22) Filed: Apr. 11, 2003

(65) Prior Publication Data

US 2004/0205595 A1    Oct. 14, 2004

(51) Int. Cl.
*G06F 17/24* (2006.01)
(52) U.S. Cl. .................. 715/513; 715/503; 715/505
(58) Field of Classification Search .......... None
See application file for complete search history.

(56) References Cited

U.S. PATENT DOCUMENTS

| | | | |
|---|---|---|---|
| 6,035,119 A | | 3/2000 | Massena et al. |
| 6,078,924 A | * | 6/2000 | Ainsbury et al. ............ 707/101 |
| 6,094,684 A | * | 7/2000 | Pallmann .................... 709/227 |
| 6,263,492 B1 | | 7/2001 | Fraley et al. |
| 6,625,803 B1 | | 9/2003 | Massena et al. |
| 6,714,219 B1 | | 3/2004 | Lindhorst et al. |
| 6,714,928 B1 | | 3/2004 | Calow |
| 6,832,215 B1 | * | 12/2004 | Gauthier et al. ............ 707/100 |
| 2002/0036662 A1 | * | 3/2002 | Gauthier et al. ............ 345/835 |
| 2003/0007009 A1 | * | 1/2003 | Haley ......................... 345/805 |
| 2003/0030672 A1 | * | 2/2003 | Hughes et al. .............. 345/765 |
| 2004/0015837 A1 | * | 1/2004 | Worthington et al. ....... 717/107 |
| 2005/0060646 A1 | * | 3/2005 | Gauthier et al. ............ 715/513 |
| 2005/0177573 A1 | * | 8/2005 | Gauthier et al. ............ 707/10 |

OTHER PUBLICATIONS

Blattner, Patrick, Special Edition Using Microsoft Excel 2002, Chapter 29—Using Excel with Access and Other Databases—"Retrieving Data from Text Files or the Web" (Que Publishing, © May 18, 2001).*

Chris Kinsman, "Create Design-Time Controls for the Web", Visual Basic Programmer's Journal, pp. 34-39, Oct. 1997.

Peter Vogel, "Create Design-Time Controls with VB", VBPJ Windows NT Enterprise Development, pp. 98-100, 1998.

Matthew B. Butler, "Supercharge VB's Forms With ActiveX", Visual Basic Programmer's Journal on-line, 1999.

* cited by examiner

*Primary Examiner*—Doug Hutton
(74) *Attorney, Agent, or Firm*—Jones Day

(57) ABSTRACT

A computer-implemented method and system for presenting information within a document creation tool. A control is associated with the document creation tool and is used to have a web page invoked. The invoked web page specifies processing data which is used by a process to generate data results. The data results are incorporated into the document creation tool.

70 Claims, 16 Drawing Sheets

FIG. 7

| Region | Product | Total Sales |
|---|---|---|
| Africa | Boot | $119,835 |
| | Men's Casual | $562,794 |
| | Men's Dress | $318,500 |
| | Sandal | $190,409 |
| | Slipper | $337,076 |
| | Sport Shoe | $22,150 |
| | Women's Casual | $417,516 |
| | Women's Dress | $374,308 |
| | | $2,342,588 |
| Asia | Boot | $62,708 |
| | Men's Casual | $11,754 |
| | Men's Dress | $119,365 |
| | Sandal | $8,208 |
| | Slipper | $152,032 |
| | Sport Shoe | $2,092 |
| | Women's Casual | $25,837 |
| | Women's Dress | $78,234 |
| Canada | Boot | $460,231 |
| | | $385,613 |

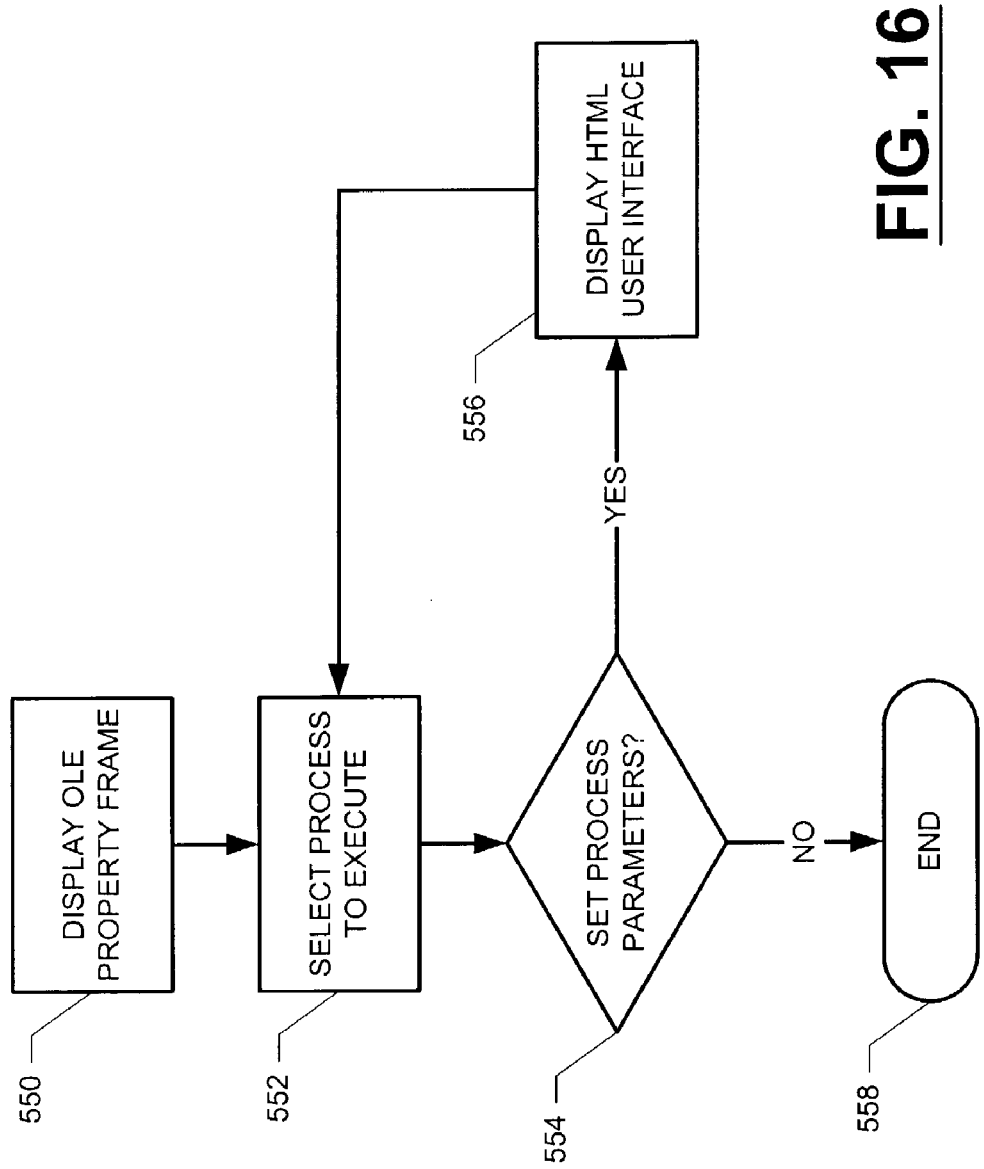

COMPUTER-IMPLEMENTED SYSTEM AND METHOD FOR WEB-BASED DATA ACCESS

TECHNICAL FIELD

The present invention relates generally to data access and more particularly to computer systems that access data via web interfaces.

BACKGROUND

Many Windows-based applications, such as Microsoft FrontPage, Excel and Word, provide a way of extending the functionality of the respective product. Currently, these extensions must be written in C++/MFC, Visual Basic (VB) or Visual Basic for Applications (VBA). However, users may lack the C++, VB or VBA skills needed to extend the desired application. Additionally, many companies, such as SAS, Cognos, Business Objects, Brio and MicroStrategy, have web-based (HTML) applications. These applications provide an HTML-based way of providing analytical results to the user. However, HTML applications may have to be rewritten in a different language in order for the HTML applications' functions to be operational within a Windows-based application or within an application which typically does not allow HTML applications to operate within or from it.

SUMMARY

In accordance with the teachings provided herein, a computer-implemented method and system are provided for presenting information within a document creation tool. A control is associated with the document creation tool and is used to have a web page invoked. The invoked web page specifies processing data which is used by a process to generate data results. The data results are incorporated into the document creation tool.

BRIEF DESCRIPTION OF THE DRAWINGS

FIG. 7 is a graphical user interface depicting analytical results being incorporated into a document creation program;

FIG. 16 is a flowchart depicting an example of an operational scenario involving a design-time control.

DETAILED DESCRIPTION

Figure 1:
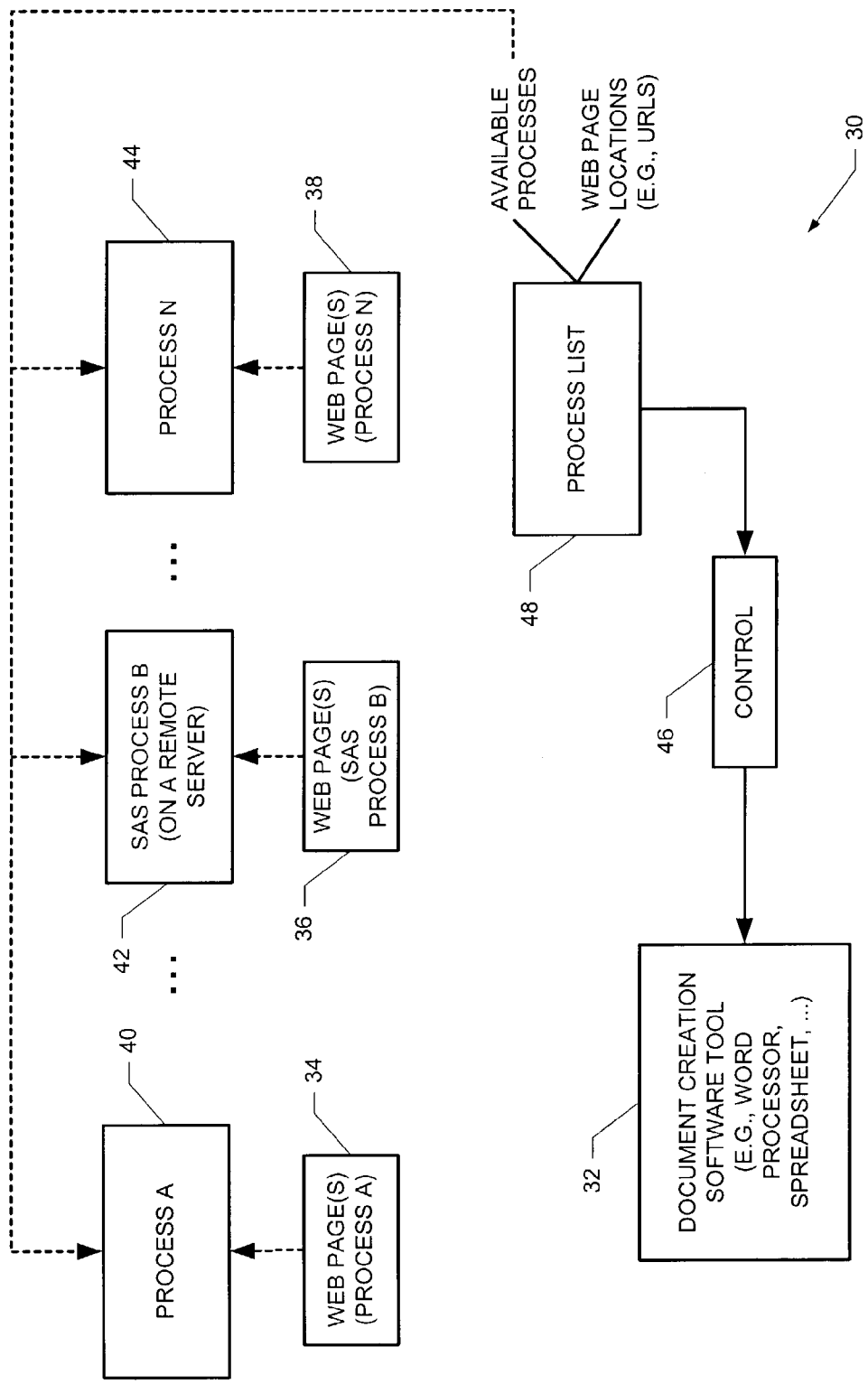
FIG. 1 is a block diagram depicting a document creation program having an associated control.

FIG. 1 shows at 30 a system that allows a document creation program 32 to access web page(s) (e.g., 34) so that data can be dynamically generated and incorporated into the document creation program 32. A user specifies processing data through the accessed web page(s) 34 which is relayed to a data generation process (e.g., 40). The process 40 generates data based upon the information specified through the accessed web page(s) 34. The generated data is then incorporated into the document creation program 32.

To help access web page(s) (e.g., 34, 36, 38) and to relay web page information to a web page's associated data generation process (e.g., 40, 42, 44), a control 46 is used with the document creation program 32. The control 46 could be provided with a list 48 of processes available for access by a user. The list 48 may contain an association between an available process (e.g., 40, 42, 44) and locations of its web page(s) (e.g., 34, 36, 38). As an illustration, the list 48 may contain process A 40 which can be used to generate current sales data as well as process B 42 which can be used to perform statistical analysis to project future sales data. A user selects a process from the list 48, such as process A 40. There are many other ways to handle a control, such as the control 46 may already be predefined with the web page(s) and/or processes that are involved in the data generation process.

Figure 2:
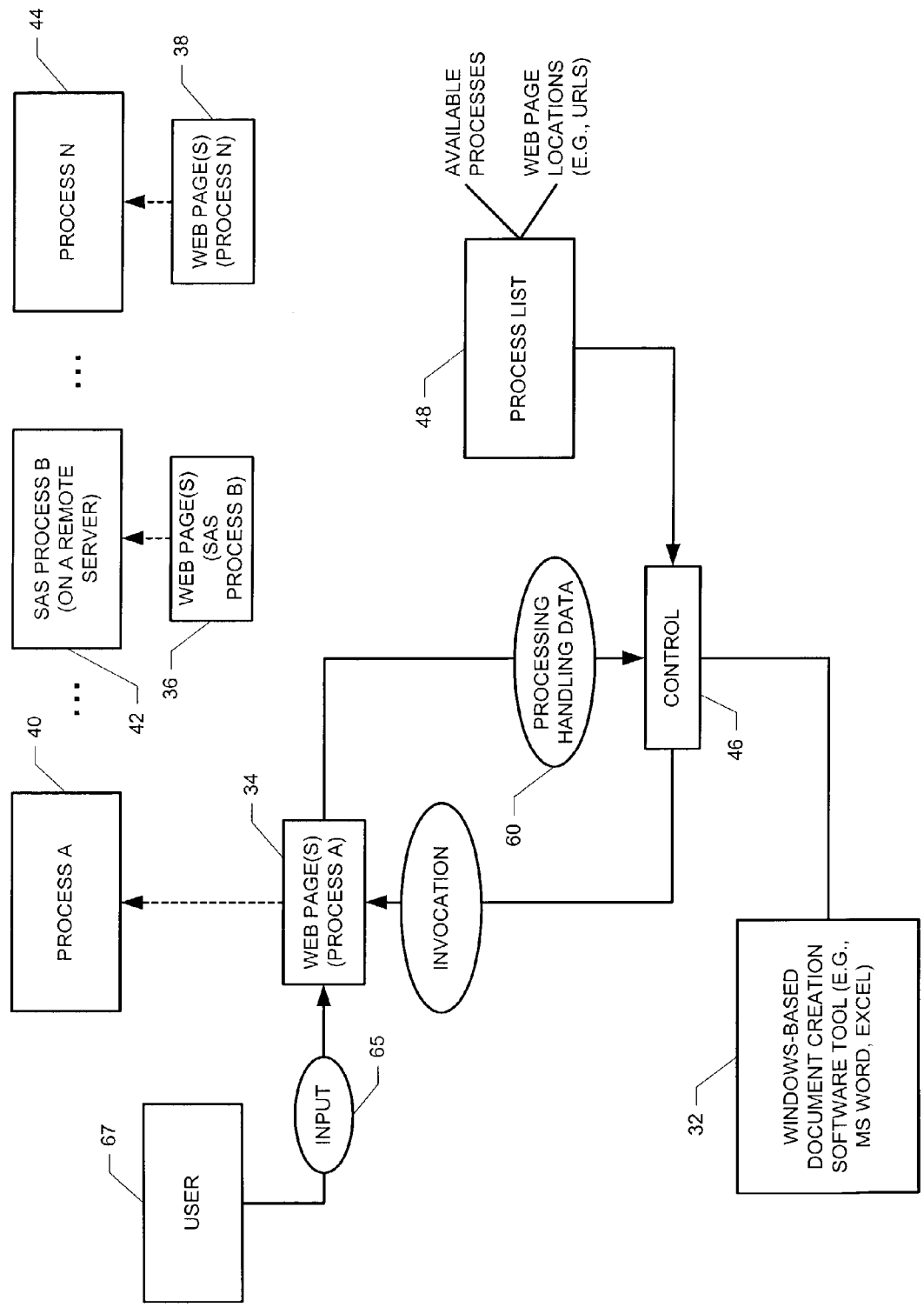
FIG. 2 is a block diagram depicting activation of web page(s) via a control.

With reference to FIG. 2, the control 46 accesses process A's web page(s) 34 based upon the location information associated with process A 40 in the list 48. The web page(s) 34 may be accessed through any type of network, such as an Internet network or an Intranet network, and so on. The web page(s) 34 includes an HTML FORM element which contains sub-elements, such as text entry fields, radio and check boxes, list boxes, etc. which are responsible for gathering input 65 from the user 67 of the document creation tool 32. The nature of the data provided by the user 67 to the interface 34 may be of any type that is relevant to a data generation process (e.g., 40, 42, 44). For example, the provided data may specify the format of the returned data, such as an eXtensible Markup Language (XML) format, ASCII tab delimited format, rich text format (RTF), etc. As a further example, the user 67 can specify a condition that the sales data to be generated by process A 40 should only be for the last three years.

Figure 3:
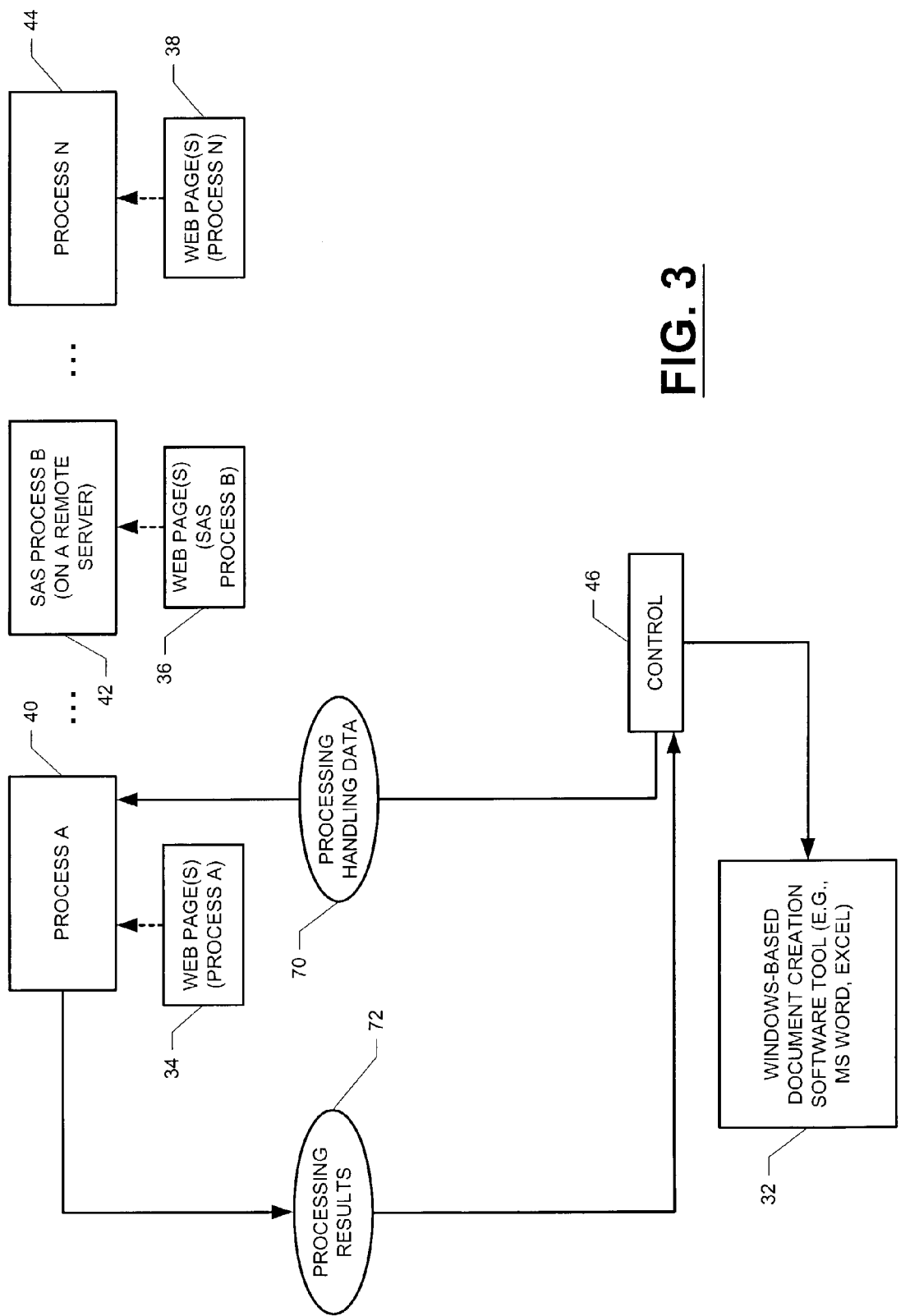
FIG. 3 is a block diagram depicting a process providing analytical results.

The control 46 collects the processing handling data 60 provided by the user 67 via the web page(s) 34, and as shown in FIG. 3 the control 46 sends the processing handling data 70 to process A 40. It should be understood that the control 46 may send a portion or all of the processing data it receives via the web page(s) 34 to process A 40. The control 46 may also supplement, transform, or replace the web page data with other data.

Process A 40 in this example then performs analytical processing based on the received processing handling data 70. The processing results 72 from process A 40 are sent to the control 46 so that the processing results 72 may be incorporated into a document of the document creation program 32.

If the user input to the web page 34 had specified that the results 72 were to be returned in an RTF format and were to be for the past three years in a bar graph format, then process A 40 would generate results for the last three years and send the results 72 in an RTF format so that an application 32 such as Microsoft Word can incorporate the results. The results 72 would also be displayed in a bar graph format.

With such an approach, the system 30 allows an HTML-based user interface to operate in software applications that run under the Microsoft Windows operating system as well as other operating systems whose applications do not typically allow HTML-based user interfaces to operate within or from them. This allows companies to reuse some or all of their pre-existing HTML user interfaces in applications such as Excel and Word. Accordingly, companies do not have to expend extra resources to translate their pre-existing HTML user interfaces into C++, VBA, or some other language in order to operate properly within the Windows-based application.

FIGS. 4–7 show example user interfaces wherein a control is created to coordinate what web pages are accessed and what processes are to be activated. In this example, a user wishes to incorporate statistical analytical results into a Microsoft Word document. A process is available which can generate the data results which the user needs. While a process and its web pages may be locally stored, the process in this example is not installed on the user's machine, but rather is located remotely on a Unix server. The Unix server contains other analytical processes that are available to a user.

Figure 4:
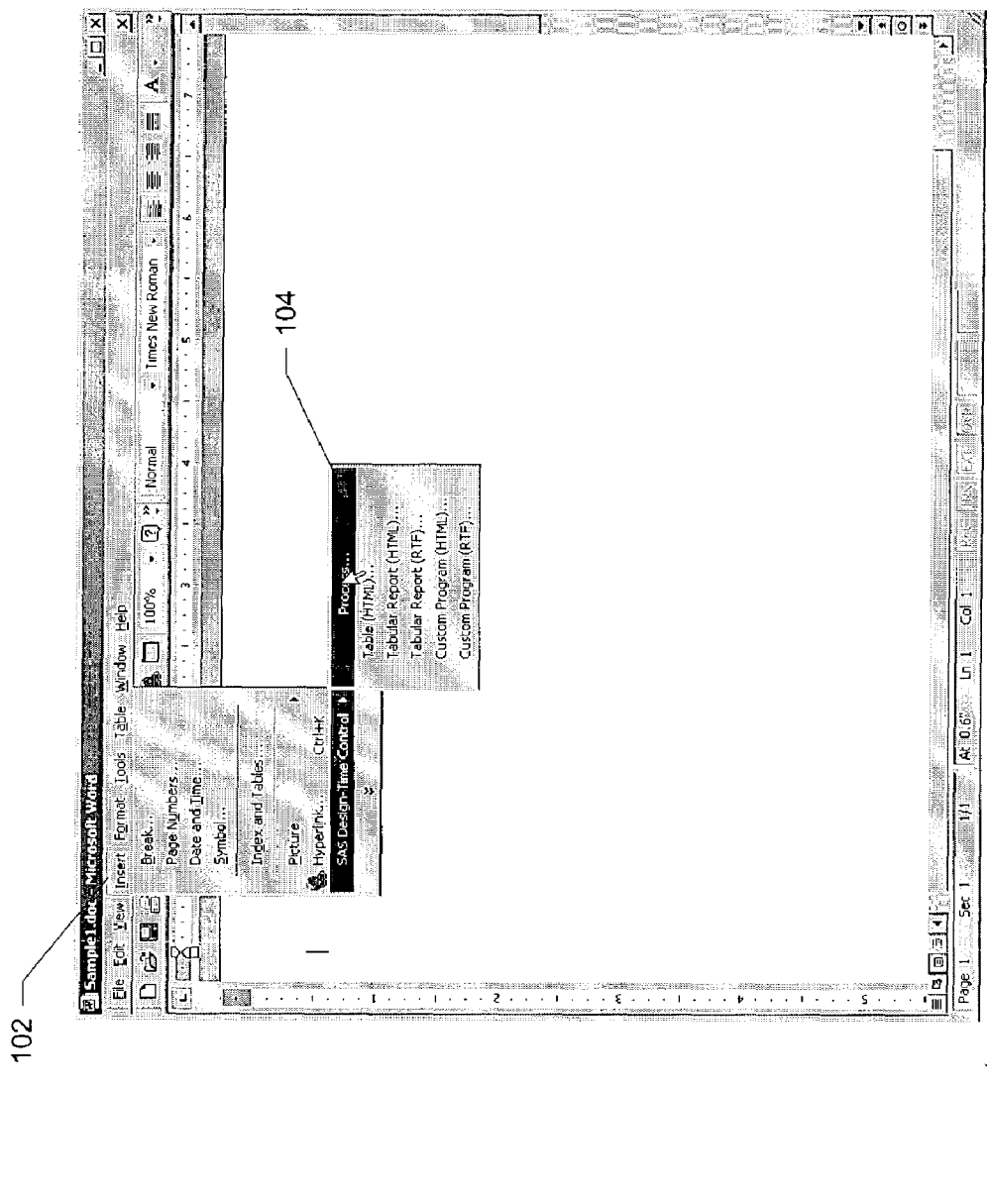
FIG. 4 is a graphical user interface from a document creation program.

With reference to FIG. 4, the user starts Microsoft Word which produces interface 100. The user clicks the "Insert" dropdown menu 102. From the menu 102, the user inserts at 104 a control that is capable of accessing processes and their associated web page(s). It should be noted that other user interface techniques can be used to associate a control with an application, such as having a wizard step a user through the process of establishing a control that can handle the desired web page(s) and process. The control may also be predefined to be associated with a document creation program.

Figure 5:
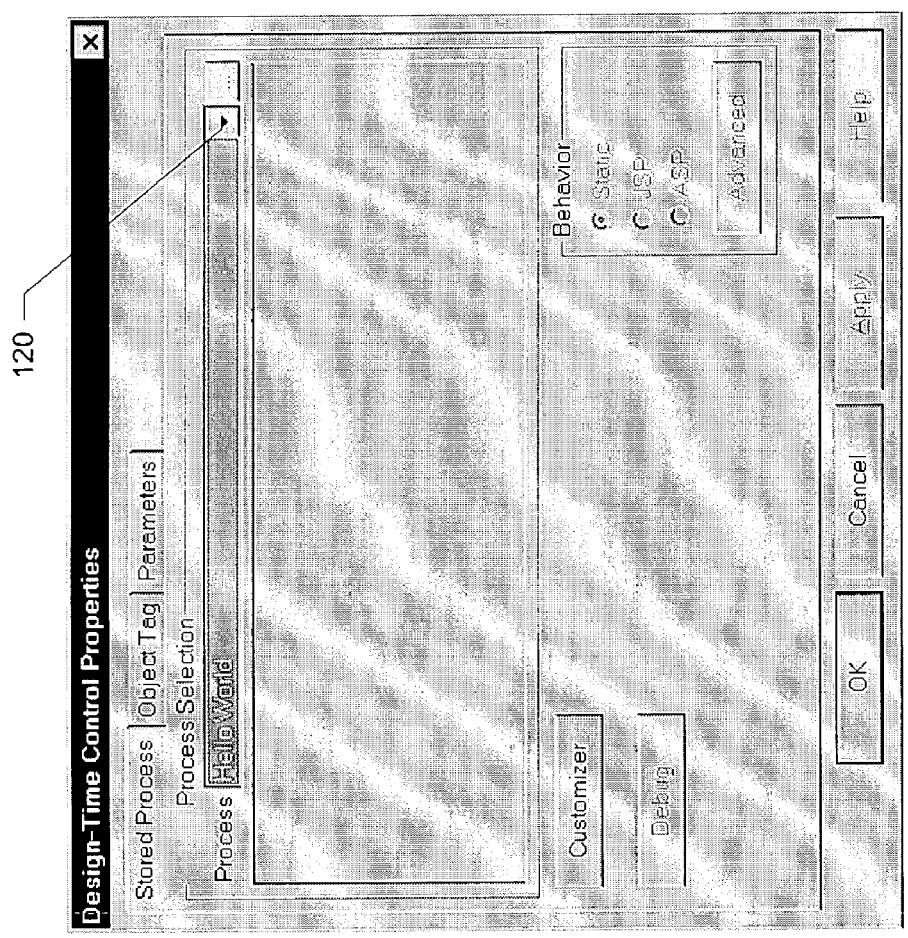
FIG. 5 is a graphical user interface depicting access of a list of processes.

As shown in FIG. 5, the user is then presented with a pulldown list 120 of processes that are available on the Unix server as well as processes on other servers. After selecting the "Shoe Sales Report" process (not shown), the HTML-based user interface 140 for this process is displayed to the user as shown in FIG. 6.

Figure 6:
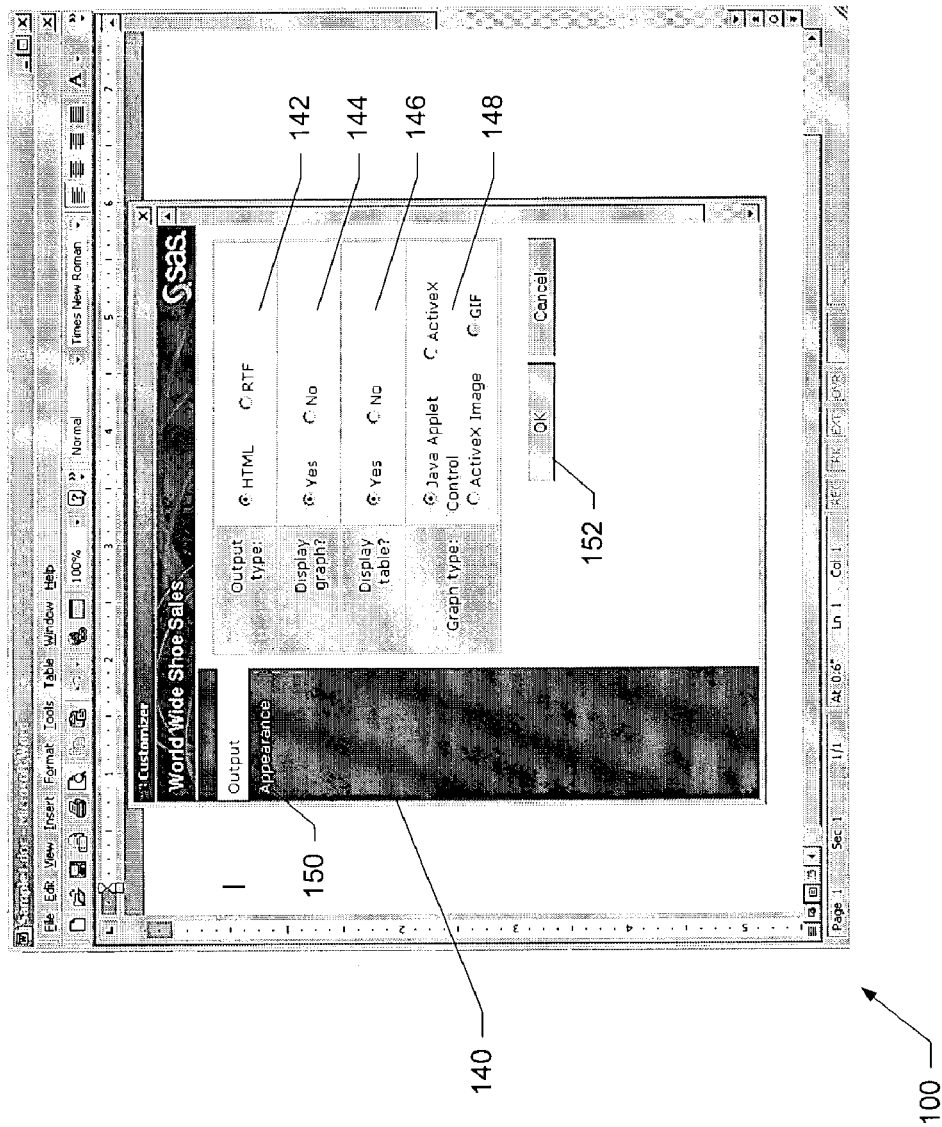
FIG. 6 is a graphical user interface depicting access of a web page.

The HTML-based user interface 140 shown in FIG. 6 is an HTML page being hosted and operational within Microsoft Word 100. The user interface 140 for the process is a web page containing an HTML FORM element with various sub-elements. The user makes appropriate selections, such as specifying the following data in the form:

Output type 142: "HTML"
Display graph 144: "Yes"
Display Table 146: "Yes"
Graph Type 148: "Java Applet"

The user may also select the appearance tab 150 on the form 140, and provide appearance information, such as what type of graphic should be used (e.g., bar graph, x-y graph, etc.); font size; font color; etc.

The user clicks the OK button 152. The selections that were made by the user in the form 140 are sent to the Unix server and are made available to the Shoe Sales Report process. The process generates output based on the selections. It is noted that the process is executed on the Unix server from within Word.

The output from the Shoe Sales Report process is seamlessly incorporated into the Word document, as shown at 170 in FIG. 7. Because the analytical results content may be specified to be automatically converted to the native Microsoft Word format, the capabilities of Word can be used to reformat the document if the user so wishes. Per the user specification through the HTML user interface, a graph 172 and table 174 are both displayed in the Word document 170. This example illustrates how analytical results can be incorporated into Word by using an HTML-based user interface. It also shows that pre-existing HTML-based user interfaces (which are also accessible to a user through the web) may be used in association with applications such as Word to incorporate analytical results directly into an application's document.

Figure 8:
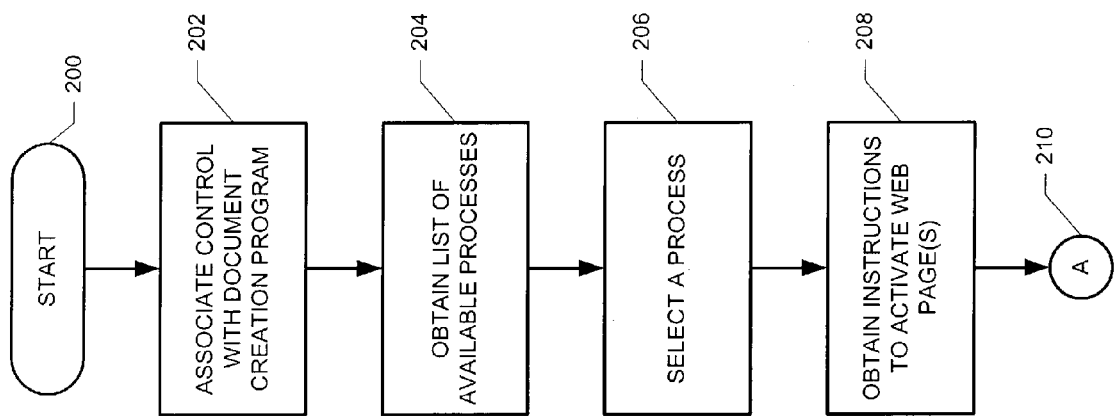
FIGS. 8–10 are flowcharts depicting an example of an operational scenario.
Figure 9:
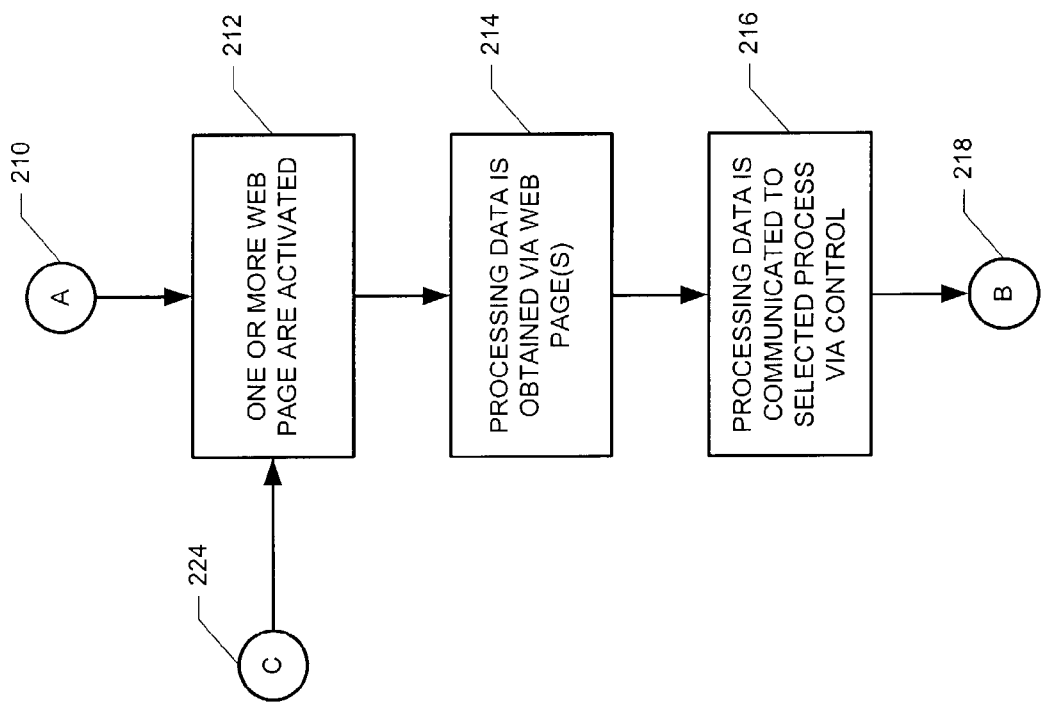
Figure 10:
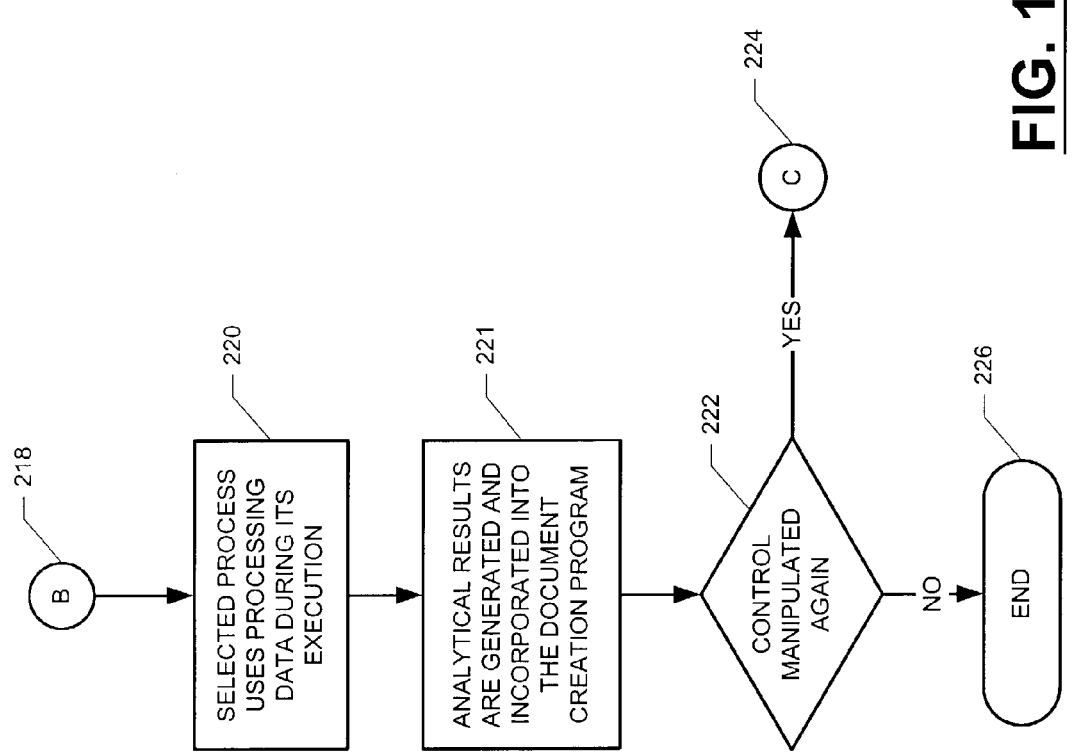

FIGS. 8–10 contain flowcharts depicting an example of another operational scenario. With reference to FIG. 8, start indication block 200 indicates that a control is associated with a document creation program at step 202. It should be understood that the control may be associated with a document creation program, or with a document (that is or was authored by a document creation program), or both.

The control may be any type of software module, such as an ActiveX control, that is inserted into a document creation program. The control could also be an object, a VBA form, etc. Still further as a non-limiting example, it may be a Java application or applet.

If the control is not already predefined with the processes and web page(s) it needs to access, then step 204 obtains a list of available processes. The list may be contained in any format, such as an ASCII text file or a table in a relational database (or data from a metadata server or data accessible via LDAP (light weight directory access protocol)).

The user selects a process at step 206. The control acquires instructions at step 208 on how to activate the web page(s) that are logically associated with the selected process as well as how to access the process. The instructions may include the computer locations for invoking (e.g., executing or at least accessing) the web page(s) and the process, such as URL (uniform resource locator) information. The URL information regarding the web page(s) may also be a reference to run a program that dynamically creates the web page(s). As an example, the program may be a Java server page (JSP) or CGI (common gateway interface) program or active server page (ASP) program that creates web page(s) on-the-fly, etc. Processing continues on FIG. 9 as indicated by continuation indicator 210.

With reference to FIG. 9, the control invokes at step 212 the web page URL associated with selected remote process. The invocation may occur automatically after the control is associated with the document, or the invocation may be deferred until some additional manipulation of the created control occurs by the user.

After the control invokes the web page application, the user's web browser program is used to display the web page through the control. The web page application is used to obtain information from the user regarding execution of the remote process (e.g., the obtained information is used to set properties for the server code, such as what type of output is to be returned). Optionally, the web page is not posted when the user clicks OK, but is simply closed, and processing returns to the control which then acquires at step 214 the information specified on the web page, such as through the form's field name/value pairs. As an example, the form may have a field name called "OutputType" which has a user-specified value of "HTML".

The selected process is executed, and the control sends at step 216 the web page information to the process. It is noted that the control may directly or indirectly provide the web page information to the process. As an illustration, multiple communication programs may be involved in transferring the information from the control to the process, especially if the process is not locally located. Processing continues on FIG. 10 as indicated by continuation indicator 218.

With reference to step 220 of FIG. 10, the selected process runs and generates analytical results based at least in part upon the information provided by the control. It is noted that the process may be a relatively "simple" program in retrieving pre-ordained data from a database, or may be a highly sophisticated analytical program contained within a data mining application. Still further, the control may reference an analytical processing model located in a model repository. A model repository contains many models and facilitates the searching and retrieval of the one or more desired models. The control may supply to the model repository the searching criteria which the model repository may then use to locate the one or more models that are needed to perform the desired processing. The searching criteria provided by the control to the model repository may be based upon information supplied by the user through the web page(s). An example of a model repository system with search indexes and the like (which can be used with a control) are described in the following patent document which is incorporated by reference herein: co-pending U.S. patent application entitled "Model Repository" with U.S. Ser. No. 09/668,077 filed on Sep. 22, 2000 (Chu et al.).

At step 221, the analytical results are sent back to the requesting computer. The results may be sent to the control from process A; or the results may be handled by a different control which places the results directly in a document of the document creation software program. Optionally, the document creation program may sit idly by for the analytical results until the control has completed its operation, or may sit idly by until the results are returned, or may allow the user to continue using the document creation program while the results are being generated.

As indicated by continuation indicator 224, processing continues at process block 212 on FIG. 9 if the control is manipulated again (as determined by decision block 222). Otherwise, processing ceases at end block 226.

It should be understood that similar to the other processing flows described herein, the steps and order of the steps in the flowcharts of FIGS. 8–10 may be altered, modified and/or augmented and still achieve the desired outcome. As an illustration, additional controls (e.g., ActiveX controls) may be used with the document creation program to handle the presentation of the returned results from a process. Presentation-related properties of the presentation control may be set either by default or by the user or by the information acquired by the web page. Depending upon the situation at hand, the presentation control may operate independently of or in concert with the control handling the web page(s) and processes.

Also while not necessary, graph styles data structures may be used to set one or more styles of the analytical results. For example, FIG. 7 contained herein shows graph 172 that was generated using a graph styles data structure. The techniques associated with creating and using a graph styles data structure are disclosed in the following patent document which is incorporated herein by reference: co-pending U.S. patent application entitled "Computer-Implemented System And Method For Generating Data Graphical Displays" with U.S. Ser. No. 10/122,584 filed on Apr. 15, 2002 (Patel et al.).

Figure 11:
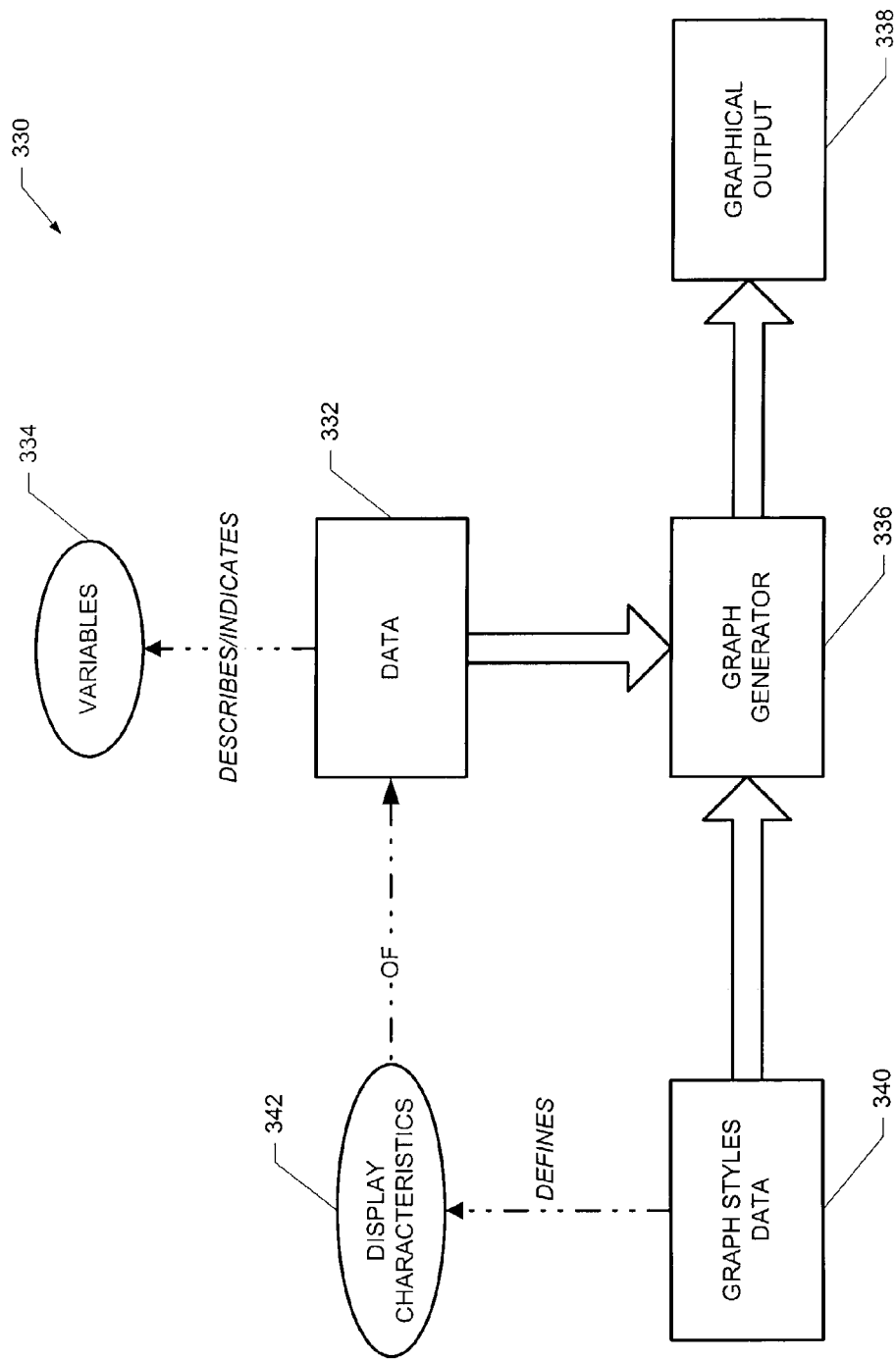
FIG. 11 is a block diagram depicting software and computer components utilized in generating graphical output.

In reference to the graph styles techniques, FIG. 11 depicts a computer-implemented system 330 that generates graphical output 338 based upon input data 332. Input data 332 may have been generated via a web page and process activated by a control. The input data 332 may represent many types of variables 334, such as sales variables, statistical variables, manufacturing output variables, engineering design variables, etc. A graph generator software module 336 processes the input data 332 and generates pie charts, bar charts, maps, scatter plots, or any other type of graphical output 338.

In order to determine how the graphical output 338 should appear, the graph generator 336 accesses graph styles data 340. The graph styles data 340 defines the display characteristics 342 of the data 332. For example, the graph styles data 340 may define the textual label font characteristics or the background display of the graphical output 338. The graph styles data 340 uses predefined style definitions as well as metadata to determine how input data 332 should be visually depicted in the graphical output 338.

Figure 12:
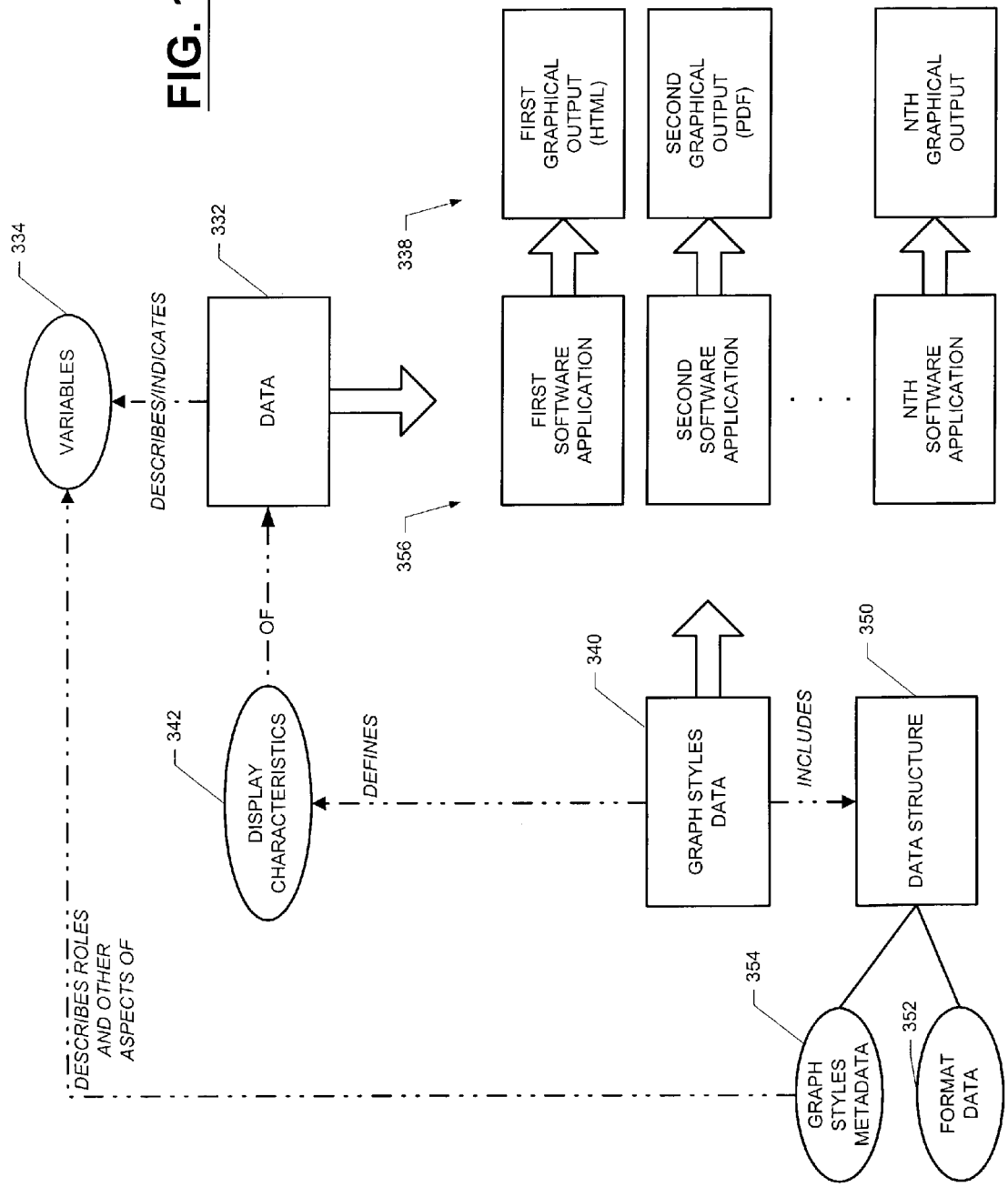
FIG. 12 is a block diagram depicting software and computer components utilizing a graph styles data structure to generate graphical output.

FIG. 12 shows an example where the graph styles data 340 is stored in a data structure 350 that contains graph styles format data 352 and graph styles metadata 354. The graph styles format data 352 may designate the format attributes for one or more regions of the graphical output 338, such as designating that a graph's axis should display major ticks and not display minor ticks. The graph styles metadata 354 may designate format attributes based upon the role(s) that a variable has within the input data.

The graph styles data 340 exists at least substantially independent of the application generating the data or the application generating the graphical output. Thus the same graph styles data 340 may be universally used by multiple software applications 356 to define the applications' respective graphical output appearance as well as the output type (e.g., HTML, PDF, etc.).

Figure 13:
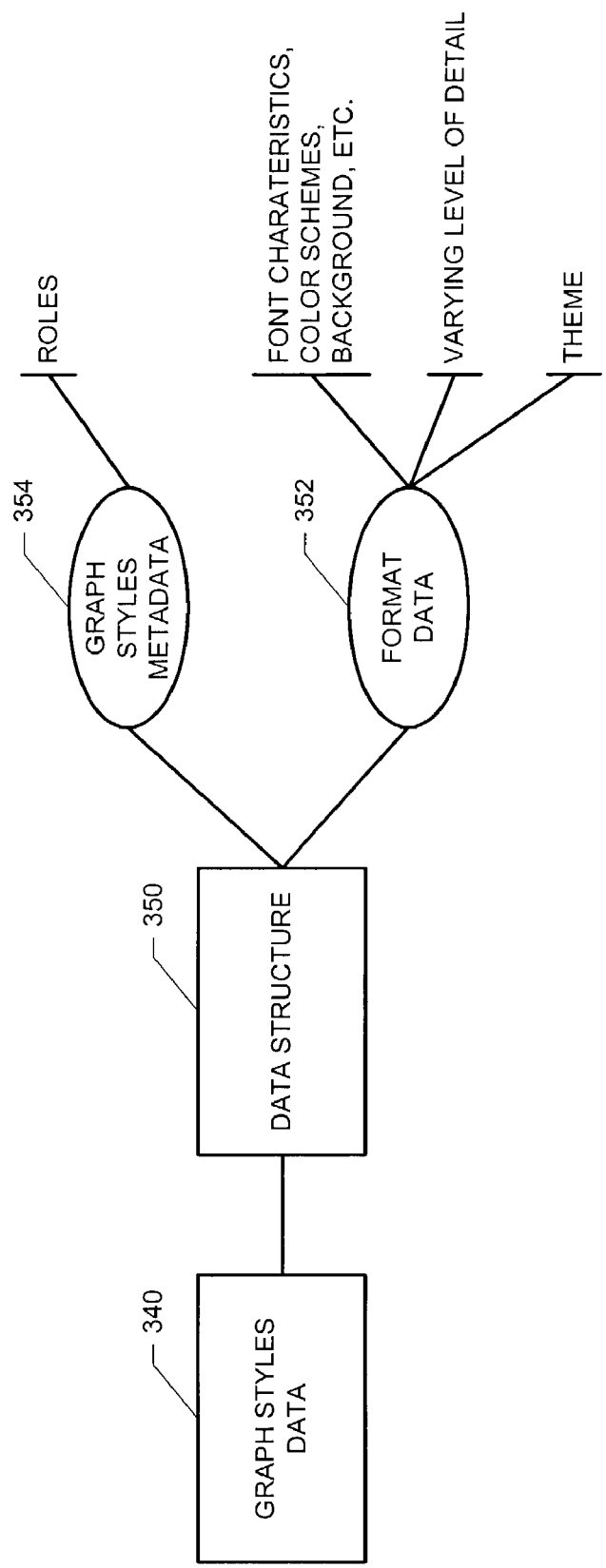
FIG. 13 is a data structure diagram depicting data items used by a graph styles data structure.

FIG. 13 depicts an example of a graph styles data structure 350. The graph styles data structure 350 contains graph styles format data 352 and graph styles metadata 354. The format data 352 may include graph font characteristics, graph backgrounds, graph color schemes, etc. The format data 352 may be at varying levels of detail. For example, the format data 352 may define styles to be used by all components on a graph, such as all bars in a bar chart. It may also define styles on a per graphical component level, such as the first bar in the bar chart should have one type of style, the second bar should have another type of style, and so on. As another example of the varying level of detail, data that is grouped into sets may have its style defined based upon what set the data is in. In this way, the user may better distinguish between sets of data when viewing the graphical output.

The graph styles data structure 340 may also contain metadata 354. The graph styles metadata 354 may designate format attributes based upon the role(s) that a variable has within the input data. For example, a variable may be designated to have as its role in the data set to be the "category" variable.

Different graphical outputs may use this metadata differently. For example, a pie chart will display a category variable differently than a bar chart will. A pie chart will display a category variable as discrete slices of a pie whereas a bar chart will display the category variable along its horizontal axis. As another example, a different variable in the input data may have as its role to be the "response" variable. Once again different graphical outputs may use this metadata differently. The pie chart will determine the size of a pie slice based upon the response variable's data whereas the bar chart will determine the vertical extent of a bar based upon the response variable's data. It should be understood that the same variable may have one or more roles, or even have different roles depending upon the data set it is in.

An aspect of a graph may be formatted based upon a combination of graph styles data associated with a variable and the variable's role. For example, a variable's role may be designated as the dependent variable of a graph. The variable may also be designated to be displayed with a bluish color. The combination of the variable's role along with its graph styles data indicates that the color of the dependent axis be depicted with a bluish color. Also, it should be understood that a variable's role may be directly associated with graph styles data by designating that the graph's independent axis be formatted with a certain style.

The graph styles data structure 350 may also contain format data 352 to indicate a theme for the graphical output. The theme may be based upon data being analyzed in the graphical output. For example, dollar symbols may be used to designate that the data being analyzed relates to money as in a sales analysis graph. The theme may be preselected within the graph styles data structure 350 or it may be a variable that is defined based upon the metadata 354. For example, if a sales variable has as its role to be the response variable, then the background of dollar signs may be selected to represent the theme of the graphical output. If the number of homes sold is the response variable, then a background showing outlines of homes may be used.

It should be understood that the graph styles data may be structured in many different ways and expressed in many different formats such as in the structure and format shown in FIGS. 4A–4E of the aforementioned co-pending U.S. patent application entitled "Computer-Implemented System And Method For Generating Data Graphical Displays".

Figure 14:
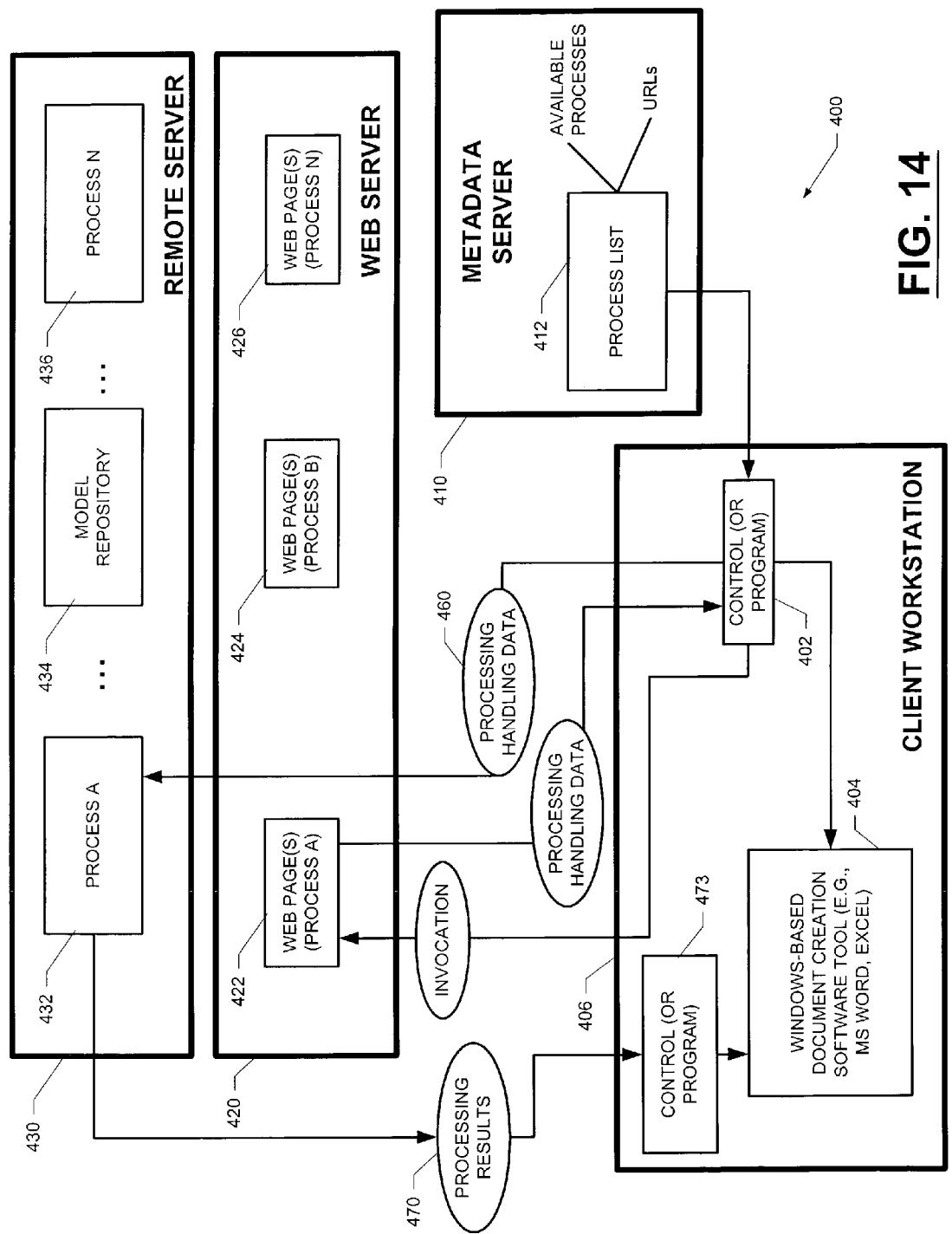
FIG. 14 is a block diagram depicting an example involving multiple servers.

A control to handle the accessing of web page(s) and processes within a document creation application may be used in many different computer environments, such as in a non-distributed environment or in a distributed environment such as the environment 400 shown in FIG. 14. FIG. 14 depicts using a control 402 within an environment of multiple servers (410, 420, 430). A control 402 and a document creation program 404 operate on client workstation 406. A metadata server 410 contains a process list 412 to indicate what processes (432, 434, 436) are available as well as locations of their web pages (422, 424, 426). The metadata server 410 also contains metadata that describes data used by the processes (432, 434, 436) on the remote server 430.

A web server 420 contains the web pages (422, 424, 426) of the processes (432, 434, 436), and another remote server 430 stores and executes the processes (432, 434, 436). As indicated above, the processes (432, 434, 436) can be widely varied in the functions they perform and may include a model repository 434 for access by the control 402. It should be understood that many different server configurations are possible, such as the remote server containing the web pages, or multiple servers separately containing the processes (432, 434, 436).

The control 402 communicates with the metadata server 410 to learn from the metadata server 410 what remote server processes (432, 434, 436) are available. The web pages (422, 424, 426) may be associated through a registration process with the metadata server 412. If so registered, then the control 402 learns from the metadata server 410 the URLs of web pages (422, 424, 426) associated with the remote processes (432, 434, 436). If not, then the control 402 may query the metadata server 410 for a process's metadata (which includes what data is relevant to operation of the process) that can be used by the control 402 for constructing on-the-fly a web page that sets parameters for a process.

Using the information acquired from the metadata server 410, the control 402 invokes, in this example, process A's web page(s) 422 and provides the processing data 460 from the web page(s) 422 to the selected process 432. The selected process 432 then generates processing results 470 in accordance with the provided processing data 460. As shown in this example (and which approach can be used with the other examples illustrated herein), a different control 473 may be used to incorporate the generated results 470 into the document creation program 404.

Figure 15:
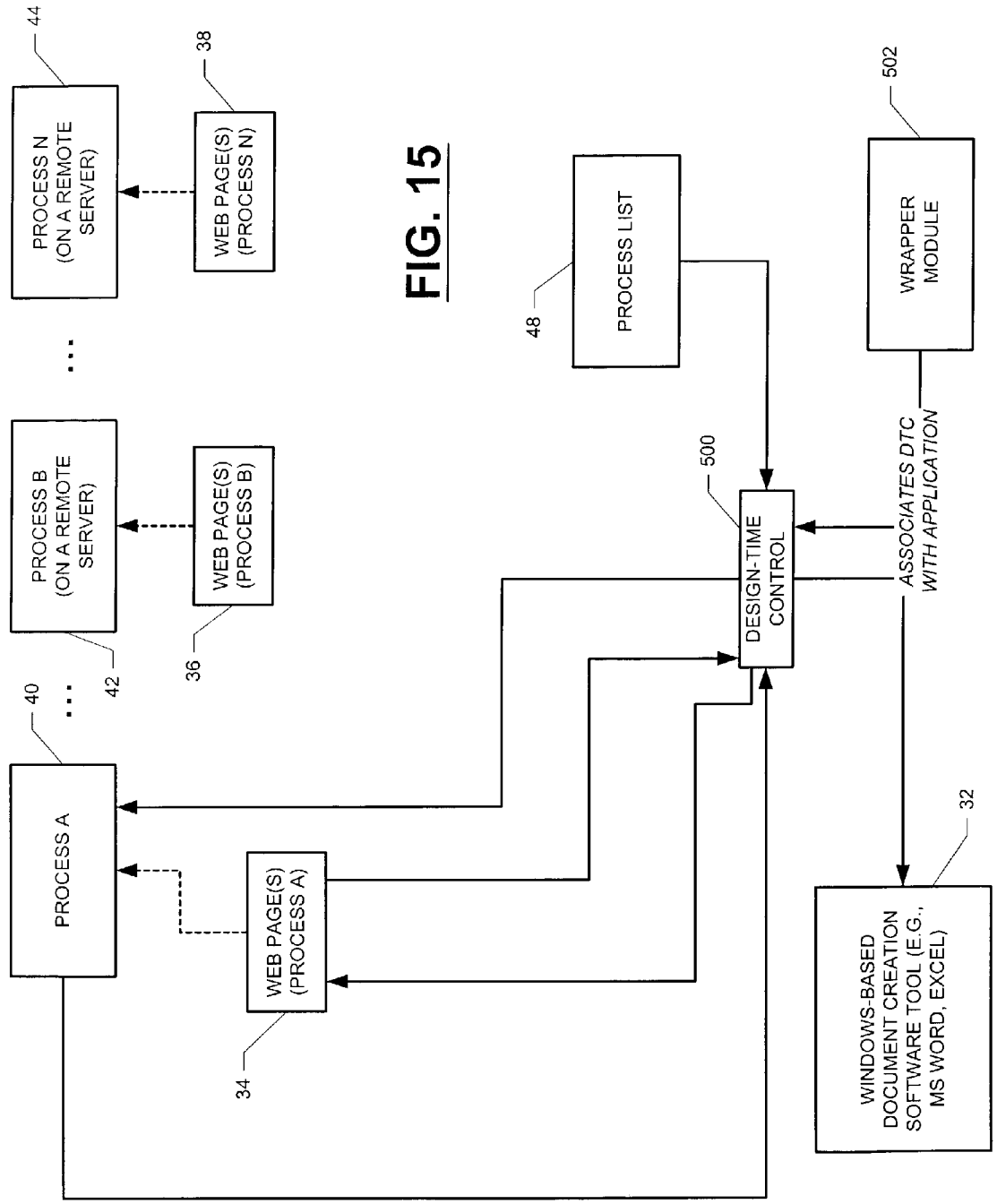
FIG. 15 is a block diagram depicting an example of using a design-time control within a document creation program in order to access a process.

While examples have been used to disclose the invention, including the best mode, and also to enable any person skilled in the art to make and use the invention, the patentable scope of the invention is defined by the claims, and may include other examples that occur to those skilled in the art. For example, the systems and methods disclosed herein may also be used with design-time controls. FIG. 15 depicts an example of using a design-time control 500 within a document creation program 32 in order to access a web page (e.g., 34) and a process (e.g., 40). A design-time control has design-time properties and run-time properties. Through the use of the design-time control 500, a user specifies processing data via the accessed web page 34. The design-time control 500 transmits the processing data to a process (e.g., 40) so that it can generate data results. The generated data results are then incorporated into a document creation tool 32.

The design-time control 500 may be hosted within a document creation program 32 through a wrapper module 502. The wrapper module 502 allows the design-time control 500 to be associated with the program 32. Techniques involving hosting a design-time control in a program are described in the following document: co-pending U.S. patent application entitled "Computer-Implemented System and Method for Hosting Design-Time Controls" (Ser. No. 09/712,099; filed on Nov. 14, 2000) which is incorporated herein by reference. It should be understood that other operations may be used for inserting the design-time control into the application. As an illustration, the document's FIG. 12 describes steps that may be used to display the properties dialog box for a design-time control. The operations described in the document's flowchart of FIG. 12 may include additional steps, such as those shown herein in FIG. 13. Such additional steps may include that after step 338 (of the document's FIG. 12) executes, step 550 (of FIG. 16 contained herein) may be performed. At step 550 (of FIG. 16 contained herein), the Windows API function OleCreatePropertyFrame is called. A handle to the control instance and the property page enumeration are passed to this function so that the correct property page tabs are created and connected to the control instance. The OleCreatePropertyFrame allows the interactive user to choose a process to execute and to display an HTML-based user interface.

At step 552 the user chooses the process to execute. If the user wishes to set parameters for the process as determined at step 554, then the HTML user interface (e.g., user interface 140 shown in FIG. 6 contained here) for this process is activated at step 556. The user closes the window when finished. When the window is closed, the parameters set in step 556 are collected and stored for later use. When processing terminates at step 558, entries are removed from the property map internal data structure. Such steps as shown in FIG. 16 contained herein illustrate the use of design-time controls in applications, display of a process's HTML user interface, and modifications to process input parameters so that they can be used by a selected process to generate results for a document creation program.

It should be noted that the systems and methods disclosed herein are applicable to any document creation program including any report generation application which wishes to access HTML-based user interfaces. Also, the same control may be used with multiple documents within the same or different document creation programs. As an illustration, a control associated with a Microsoft Word document may also be used within a different Microsoft Word document as well as in a Microsoft Excel document. Still further, a control may be defined to execute not only one but multiple processes. The control may be configured to coordinate how the data from a process may be used in subsequently operating processes, as well as be configured to cooperate with other controls that act upon other processes.

What is claimed is:

1. A computer-implemented method for presenting information within a document creation program, comprising the steps of:
   associating a control with the document creation program;
   using the control to access a data generation process and invoke a web page;
   allowing a user to specify processing data through the invoked web page;
wherein the process generates data results based upon the processing data and automatically incorporates the data results into the document creation program.

2. The method of claim 1, wherein the document creation program is an application which does not allow HTML applications to operate within itself without the association involving the control.

3. The method of claim 1, wherein the document creation program includes a Windows-based application.

4. The method of claim 3, wherein the process is accessed directly from the Windows-based application.

5. The method of claim 1, wherein the document creation program is a word processing program.

6. The method of claim 5, wherein the word processing program is a Microsoft Word program.

7. The method of claim 1, wherein the document creation program is a spreadsheet processing program.

8. The method of claim 7, wherein the spreadsheet processing program is a Microsoft Excel program.

9. The method of claim 1, wherein the document creation program is a web page authoring program.

10. The method of claim 1, wherein the document creation program comprises means for creating a document.

11. The method of claim 1, wherein the document creation program is a computer application that allows a design-time control to operate within the computer application.

12. The method of claim 1, wherein the document creation program creates reports.

13. The method of claim 1, wherein the control is predefined to store information about invoking the web page.

14. The method of claim 1, wherein the control is predefined to store information about accessing the process.

15. The method of claim 14, wherein the control is predefined to store information about how to provide, to the process, information that is based upon the specified processing data, wherein the control comprises a first control for executing the web page, wherein the control comprises a second separately operating control which places the data results into a document of the document creation program.

16. The method of claim 1, wherein a list of processes is displayed to the user, wherein the user selects the process from the list of processes, wherein the data results are generated by the selected process.

17. The method of claim 16, wherein the list of processes is displayed to the user as part of the association of the control with the document creation program.

18. The method of claim 16, wherein the list of processes includes associations between available processes and locations of web pages.

19. The method of claim 18, wherein at least one of the associations between available processes and locations of web pages is used by the control to invoke the web page through which the processing data is specified.

20. The method of claim 1, wherein the control is an ActiveX control.

21. The method of claim 1, wherein the control is an object-oriented based program.

22. The method of claim 1, wherein the control is a Java-based program.

23. The method of claim 1, wherein the control includes a VBA form.

24. The method of claim 1, wherein the control is a design-time control, wherein a wrapper module inserts the design-time control within the document creation program.

25. The method of claim 24, wherein the control has design-time properties and run-time properties.

26. The method of claim 1, wherein the web page is displayed to the user of the document creation program.

27. The method of claim 26, wherein the web page is displayed in a web browser of the user.

28. The method of claim 1, wherein the web page is dynamically generated through the control using access information acquired from a process list.

29. The method of claim 28, wherein the control accesses a program that dynamically generates the web page.

30. The method of claim 29, wherein a user is capable of accessing, independently of the control, the program through a global communication network in order to have the web page dynamically generated.

31. The method of claim 29, wherein the control accesses the program based upon uniform resource locator information acquired from the process list.

32. The method of claim 31, wherein the program includes a Java server page.

33. The method of claim 31, wherein the program includes a common gateway interface program.

34. The method of claim 31, wherein the program includes an active server page.

35. The method of claim 1, wherein a first user uses the control to invoke the web page, wherein the web page is also accessible by a second user through a global communication network, wherein the processing data is specified by the second user and used by the process to generate the data results for display in the second user's web browser.

36. The method of claim 35, wherein the global communication network is an Internet network.

37. The method of claim 1, wherein a first user uses the control to invoke the web page, wherein the web page is also accessible by a second user through an Intranet communication network, wherein the processing data is specified by the second user and used by the process to generate the data results for display in the second user's web browser.

38. The method of claim 1, wherein the web page includes an HTML form element.

39. The method of claim 38, wherein the form element contains sub-elements.

40. The method of claim 39, wherein the sub-elements are used to gather input from a user.

41. The method of claim 40, wherein the form sub-elements include elements selected from the group consisting of text entry fields, radio and check boxes, list boxes, and combinations thereof.

42. The method of claim 1, wherein the control collects user input from the web page so that the collected user input can be sent to the process.

43. The method of claim 1, wherein the control collects user input from the web page so that at least a portion of the collected user input can be sent to the process.

44. The method of claim 1, wherein the control collects user input from the web page and generates second processing data based upon the user input, wherein the second processing data is provided by the control to the process for use in the generation of the data results.

45. The method of claim 1, wherein the processing data specified through the web page includes the format of the data results to be sent to the document creation program.

46. The method of claim 1, wherein the processing data specified through the web page includes conditions about how the process is to generate the data results.

47. The method of claim 1, wherein network-related communication software is used in the communication between the control and the process.

48. The method of claim 1, wherein the control directly provides the processing data to the process.

49. The method of claim 1, wherein the data results are dynamically generated by the process and incorporated into the document creation program.

50. The method of claim 1, wherein the process performs statistical analytical processing based upon the processing data.

51. The method of claim 50, wherein the processing generates statistical analytical results for incorporation into a document of the document creation program.

52. The method of claim 50, wherein a data mining application contains the process.

53. The method of claim 50, wherein a model repository contains a model for use by the process.

54. The method of claim 53, wherein the control provides searching data to the model repository so that the model repository can select a model for use in generating the data results.

55. The method of claim 54, wherein the processing data provided to the web page is used by the control as the model repository searching data.

56. The method of claim 1, wherein the web page and the process are locally stored relative to the computer containing the control.

57. The method of claim 1, wherein the web page and the process are remotely stored relative to the computer containing the control.

58. The method of claim 1, wherein a second control is used by the document creation program to handle presentation of the data results.

59. The method of claim 58, wherein the second control contains presentation-related properties which are used to handle the presentation of the data results.

60. The method of claim 59, wherein the presentation-related properties are set by a user of the document creation program.

61. The method of claim 59, wherein the presentation-related properties are set based upon data provided to the invoked web page.

62. The method of claim 1, wherein a graph styles data structure means is used to handle presentation of the data results from the process.

63. The method of claim 62, wherein the graph styles data structure means comprises predefined style definitions and metadata which determine how the data results are to be visually depicted in a document of the document creation program.

64. The method of claim 1, wherein the process that generates the data results is a first data generation process, wherein the control is defined to execute a second data generation process that incorporates second data results into the document creation program.

65. The method of claim 64, wherein the control coordinates how the data results from the first process are used by the second process.

66. The method of claim 64, wherein the control coordinates with other controls that access other data generation processes that incorporates other data results into a document of the document creation program.

67. Computer software tangibly embodied on a computer readable media, the computer software comprising program code for carrying out a method according to claim 1.

68. A tangibly embodied computer-implemented system for presenting information within a document creation program, comprising:
  a control which is associated with the document creation program; and
  a web page which is invoked through the control,
wherein the web page includes data entry elements so that a user can specify processing data through the data entry elements, wherein the control accesses a data generation process which generates data results based upon the processing data and automatically incorporates the data results into the document creation program.

69. A tangibly embodied computer-implemented control for use in presenting information within a document creation program, comprising:
  means for invoking a web page through which a user can provide processing data;
  means for acquiring the processing data provided by the user through the web page; and
  means for sending at least a portion of the acquired processing data to a data generation process;
wherein the process generates data results based upon the processing data and automatically incorporates the data results into the document creation program.

70. A tangibly embodied computer-implemented system for presenting information within a document creation program, comprising:
  means for invoking a web page through a control, wherein the control is associated with the document creation program;
  means for allowing a user to specify processing data through the invoked web page; and
  means for accessing a process through the control;
wherein the process generates data results based upon the processing data and automatically incorporates the data results into the document creation program.

* * * * *